US012631398B2

(12) United States Patent
Shelton et al.

(10) Patent No.: US 12,631,398 B2
(45) Date of Patent: May 19, 2026

(54) SYSTEM, METHOD, AND APPARATUS FOR IMPROVED CLEANING OF INDUSTRIAL FURNACES

(71) Applicant: Integrated Global Services Inc., Richmond, VA (US)

(72) Inventors: Jefferson Landers Shelton, Jacksonville, AL (US); Connor Berry Shelton, Jacksonville, AL (US)

(73) Assignee: Integrated Global Services Inc.

( * ) Notice: Subject to any disclaimer, the term of this patent is extended or adjusted under 35 U.S.C. 154(b) by 866 days.

(21) Appl. No.: 17/444,445

(22) Filed: Aug. 4, 2021

(65) Prior Publication Data

US 2022/0042744 A1 Feb. 10, 2022

Related U.S. Application Data

(60) Provisional application No. 62/706,192, filed on Aug. 4, 2020.

(51) Int. Cl.

*B05B 1/04* (2006.01)
*F27D 25/00* (2010.01)
*B08B 5/02* (2006.01)

(52) U.S. Cl.

CPC .............. *F27D 25/008* (2013.01); *B05B 1/04* (2013.01); *B08B 5/02* (2013.01)

(58) Field of Classification Search

CPC .... B08B 5/02; B05B 1/00; B05B 1/26; B05B 1/22; B05B 1/28; B05B 1/34;

(Continued)

(56) References Cited

U.S. PATENT DOCUMENTS

D723,658 S 3/2015 Meister
2008/0265066 A1 10/2008 Miller et al.

(Continued)

FOREIGN PATENT DOCUMENTS

JP 3703110 B2 10/2005
WO 2009081426 A1 7/2009

OTHER PUBLICATIONS

International Search Report and Written Opinion; PCT/US2021/071106; mailed Nov. 3, 2021.

*Primary Examiner* — Arthur O. Hall
*Assistant Examiner* — Juan C Barrera
(74) *Attorney, Agent, or Firm* — Squire Patent Consulting & IP Law LLC; Brendan Squire

(57) ABSTRACT

A system, method, and apparatus for cleaning deposits in industrial furnaces. An improved fan jet nozzle for air cannon includes either a 4" or a 6" inner diameter circular inlet. The nozzle includes a flattening of the inlet on opposed top and bottom side walls converging towards an outlet of the nozzle. The opposed top and bottom sidewalls have convex surface protruding towards the throat of the nozzle. Lateral sidewalls converge towards the outlet of the nozzle. The lateral sidewalls have a slightly concave curvature protruding outwardly from the interior of the nozzle. The outlet may have an arcuate indentation proximal to a centerline of the lateral sidewalls. The improved performance in face area, planar are, and penetration depth permits employment of half the air cannons in an industrial furnace for cleaning while improving cleaning efficiency in the width and depth of cleaning.

12 Claims, 10 Drawing Sheets

(58) Field of Classification Search
CPC ..... B05B 1/3402; F27D 25/008; A45D 20/00; A45D 20/12; A45D 20/122
USPC .................................................. 239/589–601
See application file for complete search history.

(56) References Cited

U.S. PATENT DOCUMENTS

| | | | | |
|---|---|---|---|---|
| 2016/0243598 | A1 | 8/2016 | Nash et al. | |
| 2018/0029717 | A1 * | 2/2018 | Al-Alusi | B64D 13/00 |
| 2018/0250691 | A1 * | 9/2018 | Badita | A63B 69/125 |
| 2019/0390562 | A1 * | 12/2019 | Brewer | G05D 7/01 |

* cited by examiner

SYSTEM, METHOD, AND APPARATUS FOR IMPROVED CLEANING OF INDUSTRIAL FURNACES

CROSS-REFERENCE TO RELATED APPLICATION

This application claims the benefit of priority of U.S. provisional application No. 62/706,192 filed Aug. 4, 2020, the contents of which are herein incorporated by reference.

BACKGROUND OF THE INVENTION

The present invention relates to air cannon for cleaning deposits in industrial furnaces, and more particularly to fan jet nozzles employed with such air cannon.

Fan jet nozzles have been the industry standard in cement applications for decades. As such, the majority of air cannons in the cement industry employ a fan jet nozzle. The cleaning blast delivered is wide from side to side and narrow from top to bottom. That nozzle is designed to clean a wide area at the cost of reduced penetration of buildup. The typical fan jet nozzle cleans between 1 and 1.5 meters into the application. That range is often insufficient and requires the employment of supplemental cleaning methods.

Air cannon manufactures have been slow to create a solution. Most nozzle innovations have only been successful at modifying the industry standard rather than reinventing it.

As can be seen, there is a need for improved systems, methods, and apparatus for air cannon cleaning in industrial furnaces.

SUMMARY OF THE INVENTION

In one aspect of the present invention, a fan jet nozzle for air cannon cleaning system of a kiln refractory is disclosed. The fan jet nozzle includes an inlet at a proximal end and an outlet at a distal end. Opposed top and bottom sidewalls converge inwardly along a longitudinal axis of the fan jet nozzle towards the outlet. An interior of the opposed top and bottom sidewalls have a convex curvature protruding towards an interior throat of the fan jet nozzle along the longitudinal axis. Opposed left and right lateral sidewalls converge towards the outlet, with an interior of the opposed left and right lateral sidewalls having a concave curvature protruding outwardly from the throat along a transverse axis of the fan jet nozzle.

In some embodiments, an arcuate indentation is defined in the opposed left and right lateral sidewalls. The arcuate indentation is disposed across the transverse axis of the fan jet nozzle. The arcuate indentation may be parabolic with an apex oriented towards the inlet.

In some embodiments, an outer surface of the opposed top and bottom sidewalls are substantially flat surfaces. The outer surface of the opposed top and bottom sidewalls may be parabolic, having an apex oriented towards the inlet.

In some embodiments, the inlet has a diameter of at least 4 inches. Preferably, the inlet has a diameter of at least 6 inches.

In some embodiments, an austenitic nickel-based alloy coating.

In other aspects of the invention, an air cannon system for cleaning deposits in a kiln refractory is disclosed. The system includes a reservoir to contain a volume of a pressurized fluid. A conduit interconnects the reservoir with an interior of the kiln refractory. A fan jet nozzle has an inlet at a proximal end and an outlet at a distal end. An interior of an opposed top and bottom sidewalls have a convex surface protruding towards an interior throat of the fan jet nozzle along a longitudinal axis thereof. Opposed left and right lateral sidewalls converge towards the outlet. The fan jet nozzle is oriented to direct the pressurized fluid at a deposit accumulation area within the refractory. A valve is operable to selectively discharge the pressurized fluid through the fan jet nozzle to release the deposits from the deposit accumulation area.

In some embodiments, an interior of the opposed left and right lateral sidewalls of the fan jet nozzle have a concave profile protruding outwardly along the transverse axis of the fan jet nozzle.

In some embodiments, an inner surface of the outlet flares radially outwardly around a periphery of the outlet.

In some embodiments, a distally protruding curvature is defined across the opposed top and the bottom sidewalls.

In other aspects of the invention a fan jet nozzle is disclosed. The fan jet nozzle includes an inlet at a proximal end and an outlet at a distal end. An interior sidewall of an opposed top and bottom sidewalls having a convex curvature protruding towards an interior throat of the fan jet nozzle along a longitudinal axis thereof. An interior sidewall of an opposed left and right lateral sidewalls have a concave curvature protruding outwardly from the throat along a transverse axis of the fan jet nozzle.

In some embodiments, an arcuate indentation is defined about the outlet proximal to a transverse centerline of the opposed left and right lateral sidewalls.

In some embodiments, the outlet also includes an inner surface that flares radially outwardly around a periphery of the outlet.

In yet other embodiments, the outlet includes a distally protruding curvature across the opposed top and the bottom sidewalls.

These and other features, aspects and advantages of the present invention will become better understood with reference to the following drawings, description and claims.

DETAILED DESCRIPTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, embodiments of the present invention provide a system, method, and apparatus for cleaning deposits in industrial furnaces. An improved fan jet nozzle according to aspects of the invention improves the efficiency of air cannons employed in industrial kiln furnaces used in the production of cement.

Figure 1:
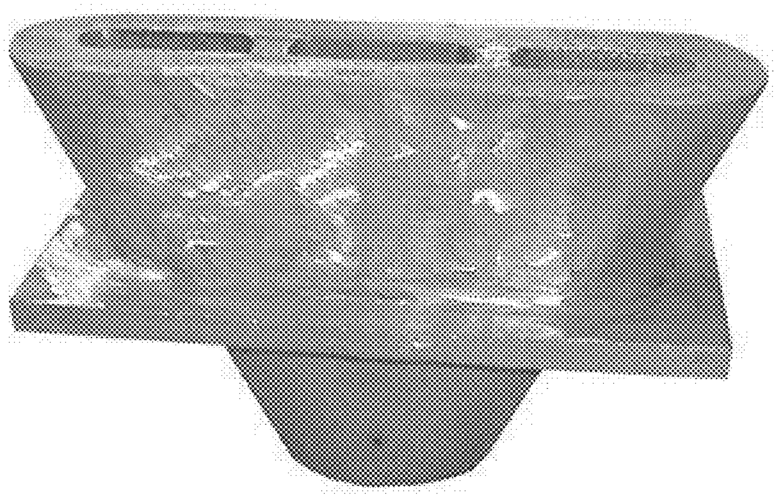
FIG. 1 Prior Art
FIG. 1 is a side perspective view of a prior fan jet nozzle utilized with industrial air cannon cleaning systems.

Conventional fan jet nozzles, such as shown in reference to FIG. 1 require a large cut in the applications and limits replacement options. The rectangular shape of the traditional fan jet nozzle mounting plate requires the refractory to be knocked out, which is time consuming and requires refractory repair once the nozzle is installed.

Figure 2:
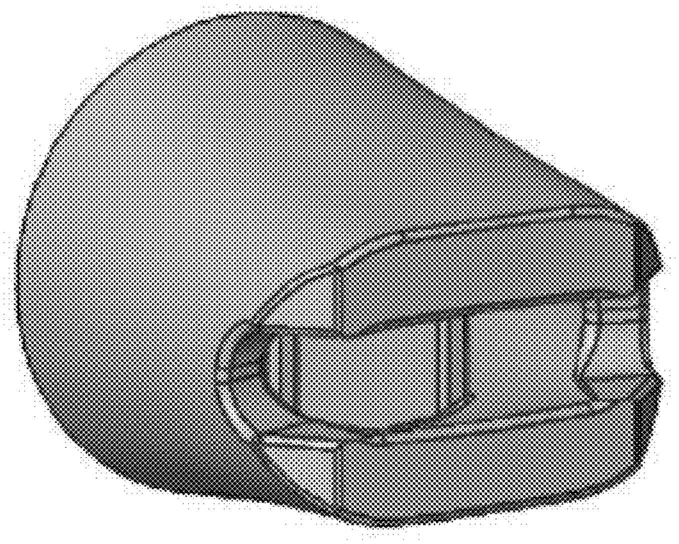
FIG. 2 Prior Art
FIG. 2 is a front perspective view of a prior art "smart" fan jet nozzle, by Martin Engineering, utilized with industrial air cannon cleaning systems.

A round fan jet nozzle, such as shown in reference to FIG. 2, was designed by Martin Engineering that allows the refractory to be removed with a core drill and thereby eliminates or substantially reduces the need for refractory repair. While, the smaller fan jet nozzle eliminated installation challenges, it failed to solve the underlying problem. As with the traditional fan jet nozzle, it only penetrates between 1 and 1.5 meters into the application. Many producers, therefore, must supplement with manual rod cleaning, high-pressure water washing, or cardox cleaning, all of which are expensive and dangerous.

Figure 3:
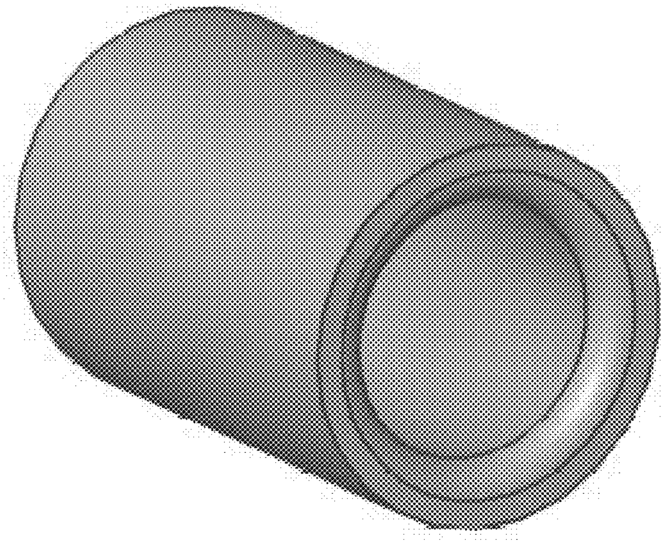
FIG. 3 Prior Art
FIG. 3 is a front perspective view of a prior art round high velocity nozzle utilized in industrial air cannon cleaning systems.

A conventional high velocity nozzle is shown in reference to FIG. 3.

Figure 4A:
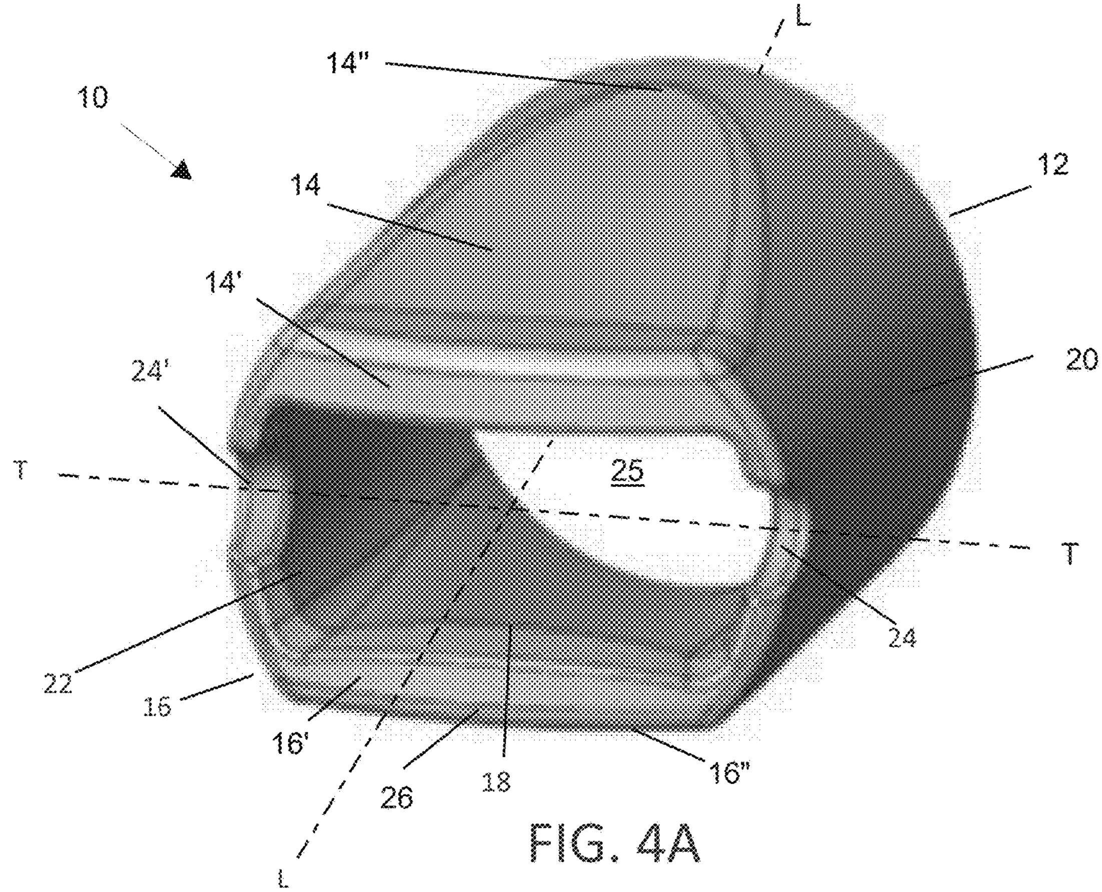
FIG. 4A is a front perspective view of an embodiment of an improved fan jet nozzle for industrial air cannon cleaning systems.
Figure 4B:
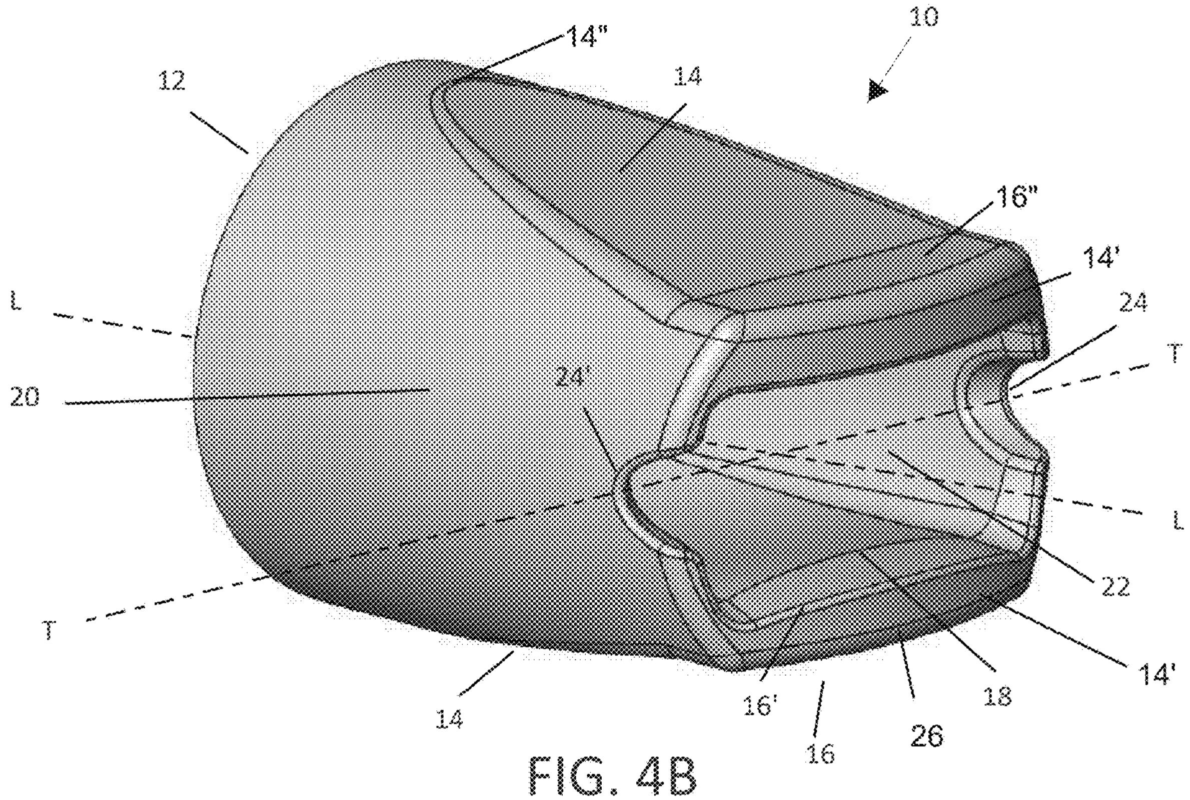
FIG. 4B is a side front perspective view of an embodiment of an improved fan jet nozzle for industrial air cannon cleaning systems.

The improved nozzle of present invention, shown in reference to FIG. 4, eliminates the turning vanes and in the case of the 6-inch ID nozzle, expanded the inlet size. Those changes transfer the air from an air cannon charge tank to the accumulated deposits of the application rapidly. The result is a briefer, but far more powerful cleaning pattern with the mass flow rate maximized. The mass flow rate is defined as the mass of a substance which passes per unit of time. To improve the mass flow rate, an unobtrusive fan jet nozzle 10 according to aspects of the invention is provided.

Unlike previous nozzles, the improved fan jet nozzle 10 of the present invention, shown in is not a modification. It is an entirely new nozzle. The new nozzle addresses the problems of limited cleaning range in air cannon cleaning systems. A system employing the improved fan jet nozzle 10 reduces the number of air cannons 30 employed and lead to huge savings for cement producers. The improved fan jet nozzle 10 is configured to deliver an enhanced mass flow rate to dislodge deposits.

The improved fan jet nozzle 10 may be made with a conventional 4" inner diameter inlet 12. More preferably, the improved fan jet nozzle 10 is employed with a 6" inner diameter inlet 12 at a proximal end. The inlet 12 is adapted to be coupled with an air distribution pipe 32 of an air cannon system 30. The fan jet nozzle 10 includes a parabolic shaped flattening 14 from inboard of the inlet 12 on opposed top and bottom sidewalls 14' converging inwardly along a longitudinal axis L of the fan jet nozzle 10 towards an outlet 16 at a distal end of the fan jet nozzle 10. The parabolic shaped flattening 14 having an apex 14" oriented towards the inlet 12. An interior surface of the opposed top and bottom sidewalls 14' have a convex curvature 18 protruding inwardly towards the interior throat 25 of the fan jet nozzle 10 defined along each of the longitudinal axis L and a transverse axis T of the fanjet nozzle. The lateral sidewalls 20 converge towards the outlet 16 of the fan jet nozzle 10. The interior surface of the lateral sidewalls 20 may have a concave curvature 22 extending outwardly from the interior of the fan jet nozzle 10 along the transverse axis T of the fan jet nozzle 10.

The outlet 16 has an arcuate indentation 24 proximal to a transverse centerline T of the lateral sidewalls 20. An apex 24' of the arcuate indentation 24 may also be parabolic and oriented towards the proximal end of the fan jet nozzle 10. An inner surface of the outlet 16 flares outwardly around a periphery 16' of the outlet 16. The outlet 16 has a distally protruding curvature 26 across the opposed top and the bottom sidewalls 14'. A top and a bottom surface 16" of the outlet 16 may be flattened relative to the opposed top and bottom sidewalls 14'.

The conventional fan jet nozzle utilized in industrial kiln air cannons produce, on average, a mass flow rate of 9.8 lbm/s. The improved 6" ID fan jet nozzle 10 of the present invention more than quadruples the conventional mass flow output and produces a mass flow rate of 37.9 lbm/s. By substantially improving the mass flow rate, the improved fan jet nozzle 10 produces a cleaning blast with more weight behind it. That enables the cleaning blast to push through buildup and extend farther into the application.

TABLE 1

Nozzle Performance Summary (Steady Flow @ 100 psi)

| Metric | Units | High Velocity Air | Martin Smart Air | New ASC R4 Air | New ASC 6" Air |
|---|---|---|---|---|---|
| Centerline Pianar Area >= 100 ft/s | sqft | 17.9 | 34.1 | 27.7 | 46.1 |
| Catalyst Face Area >= 100 ft/s | sqft | 1.5 | 0.2 | 3.3 | 4.7 |
| Mass Flow Rate | lbm/sec | 18.5 | 9.8 | 1.75 | 37.9 |
| Equiv. Volume Flow Rate | CFM | 2052 | 1044 | 1959 | 4228 |
| Peak Force @ 1 ft. Downstream | lbf | 477 | 253 | 458 | 1018 |

In conventional fan jet nozzles penetration depth comes at the cost of the width of the cleaning pattern. However, with the added mass flow of the fan jet nozzle 10 driving deeper penetration, pattern width could also be improved. To expand the pattern width, the improved fan jet nozzle 10 is designed to expand the blast laterally upon exiting the fan jet nozzle 10. The result is superior lateral cleaning with an improved penetration depth.

Figure 5:
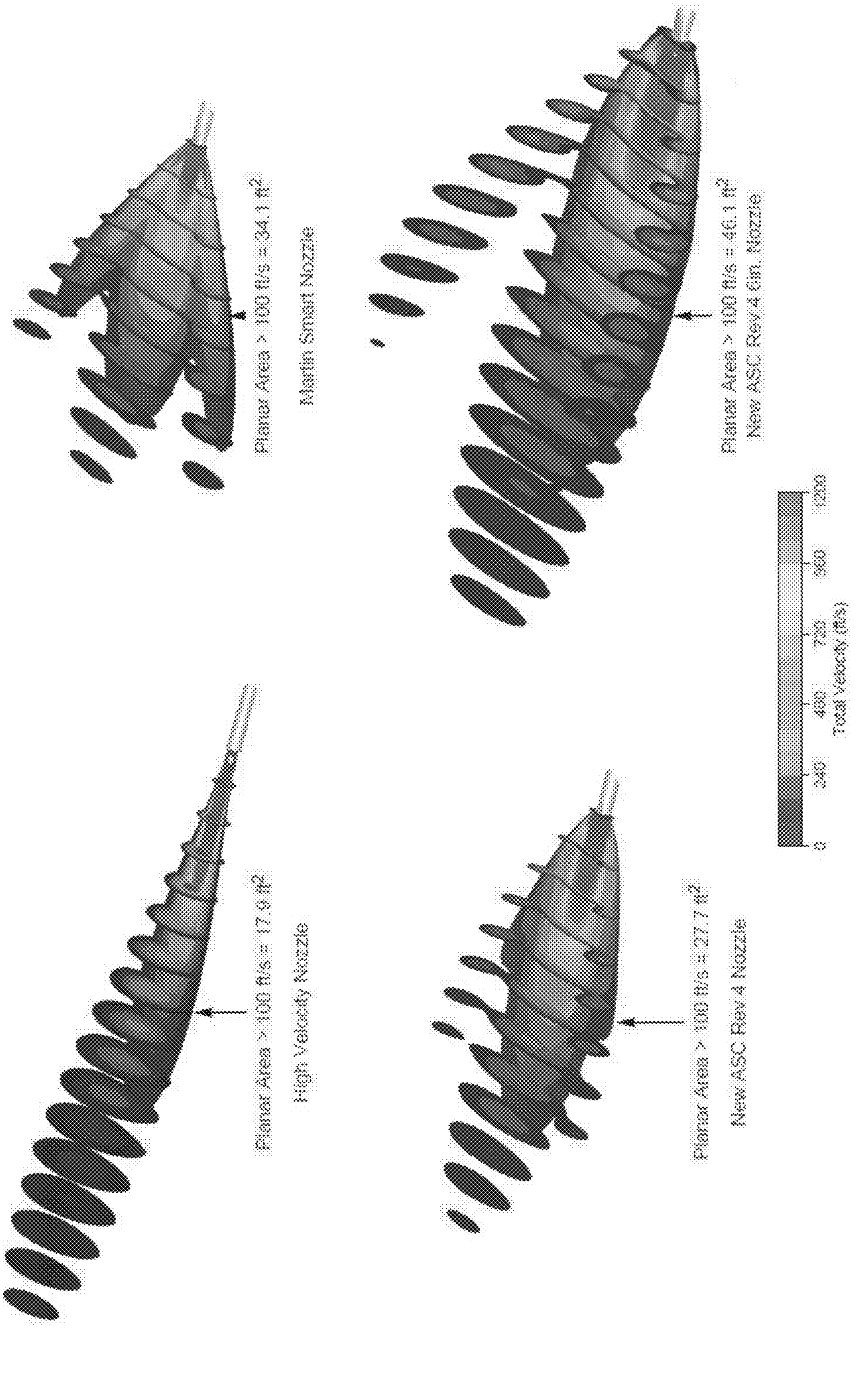
FIG. 5 is a velocity profile comparison chart shown at 100 psi steady flow Total Velocity—Nozzle Centerline w/Surfaces @ 1 ft. Spacing (>100 ft/s) at 100 psi steady flow.
Figure 6:
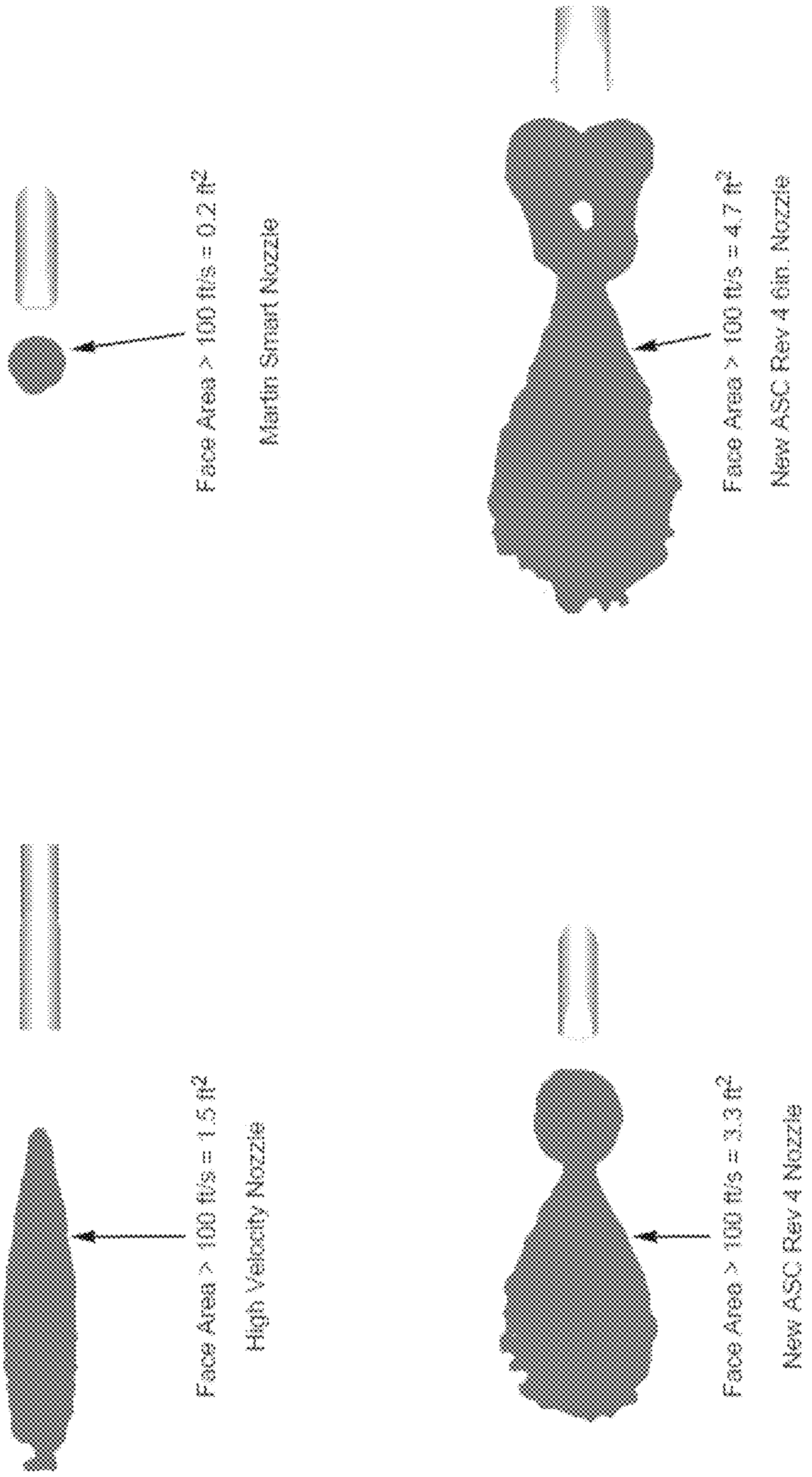
FIG. 6 is a velocity profile comparison chart reflecting the total velocity at catalyst face (>100 ft/s) at 100 psi steady flow.

As seen in the velocity profile comparisons of FIG. 5, another strength of the improved fan jet nozzle 10 is the achieved lateral width of the cleaning pattern. As seen in the comparison of cleaning width patterns of FIGS. 5 and 6, embodiments of the improved fan jet nozzle 10 can clean twice the planar area with a velocity profile at least 100 ft/sec the conventional fan jet nozzle 10 and a face area maintaining a 100 ft/s velocity profile of at least 3.0 $ft^2$. The improved face area performance facilitates the movement of dislodged deposits when entrained in the air cannon blast.

The improved fan jet nozzle 10, can for example, reduce the total number of required nozzles by at least 50%. Instead of cleaning a cement tower 60 with 8 air cannons, the improved fan jet nozzle 10 enables the same level of cleaning with only four air cannons.

Figure 7A:
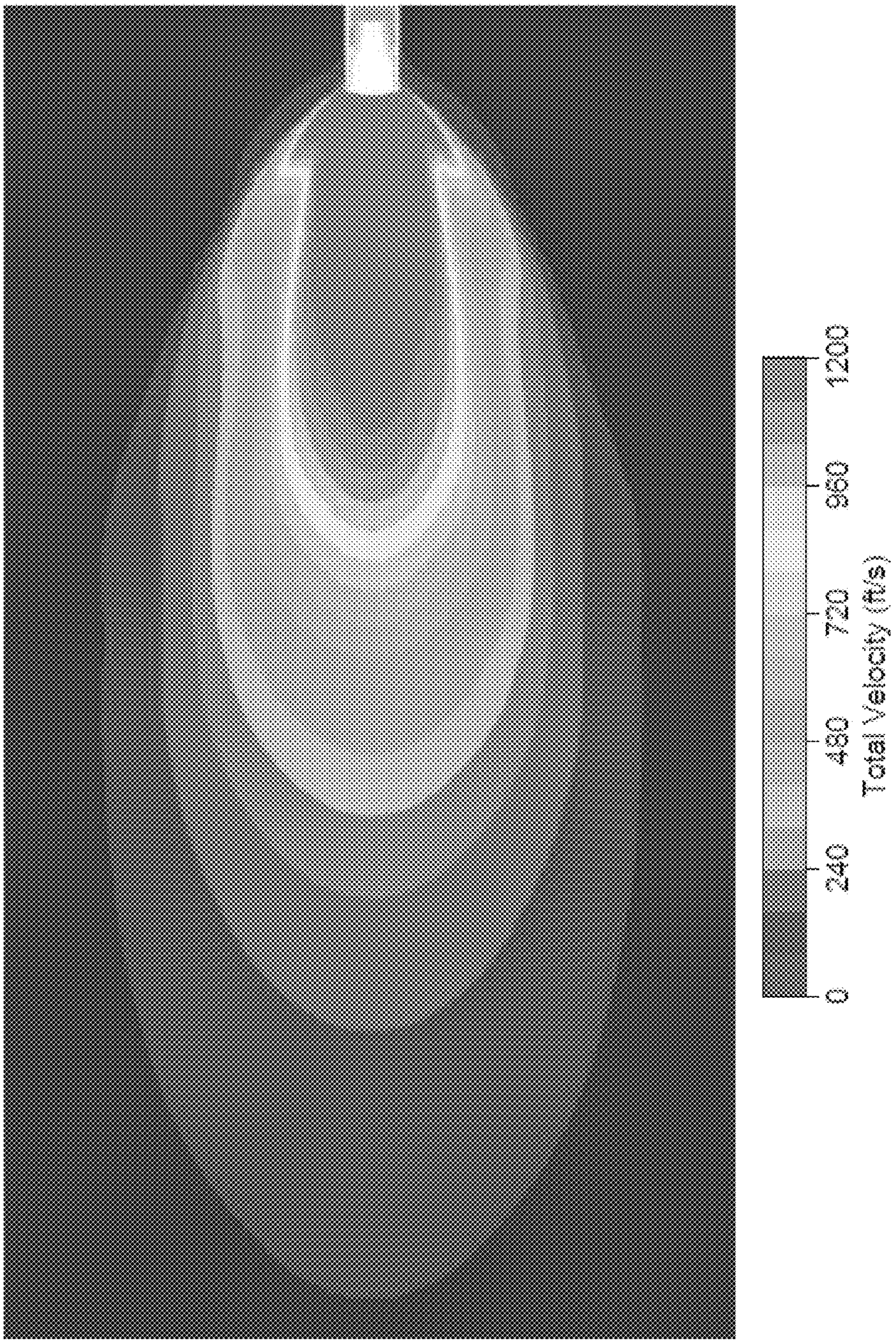
FIG. 7A is a top plan view of a velocity profile of the improved fan jet nozzle at 100 psi steady flow.
Figure 7B:
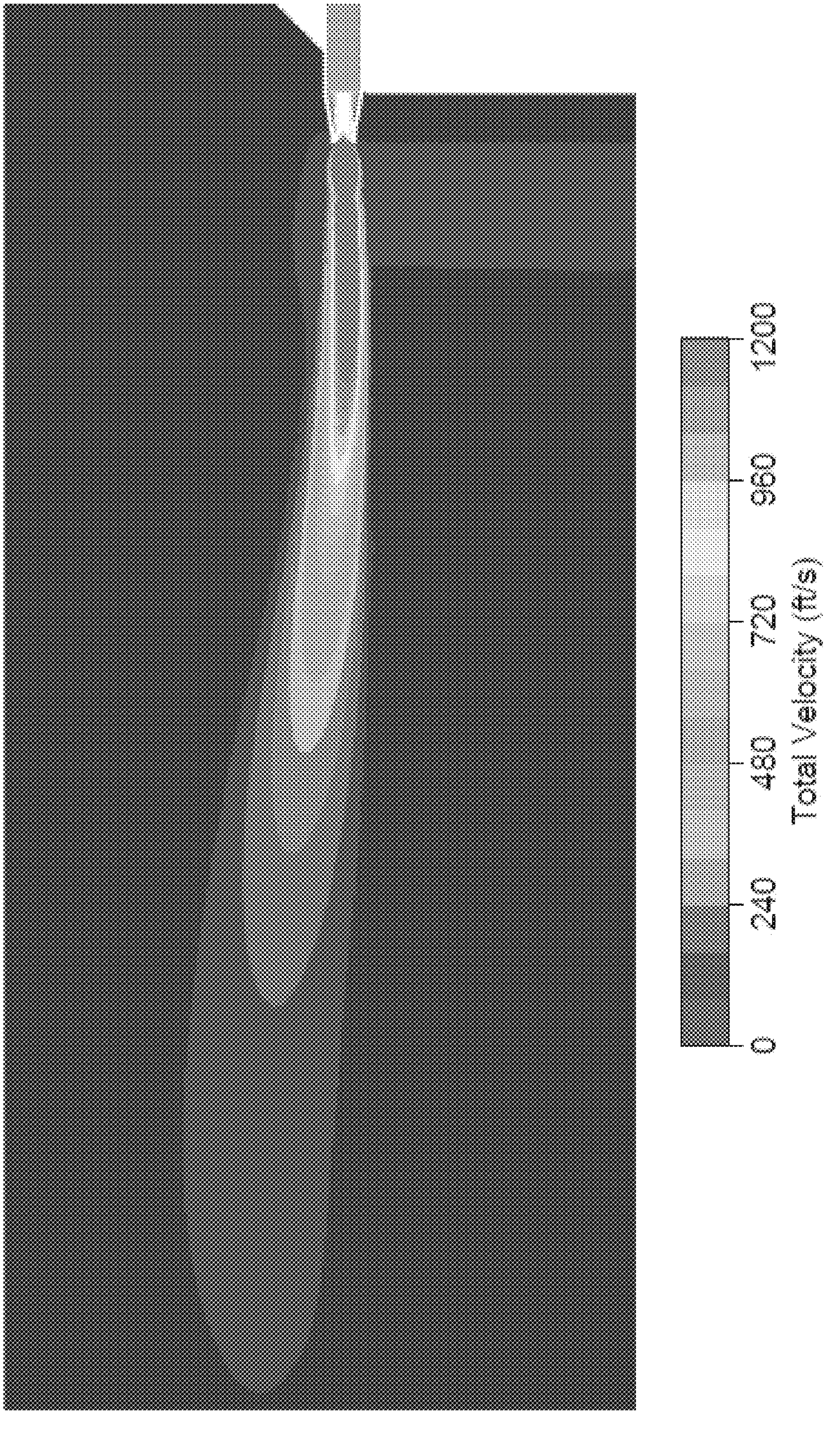
FIG. 7B is a side view of a velocity profile of the improved fan jet nozzle at 100 psi steady flow.

As previously discussed, the weakness of the conventional fan jet nozzles is the depth of cleaning. These conventional nozzles only clean s between 1 and 1.5 meters into the application. The improved fan jet nozzle discharges with greater velocity and cleans a minimum of 3 meters into the application, as shown in FIGS. 7A and 7B. This improvement eliminates the costs and hazards associated with supplemental cleaning methods.

Figure 8:
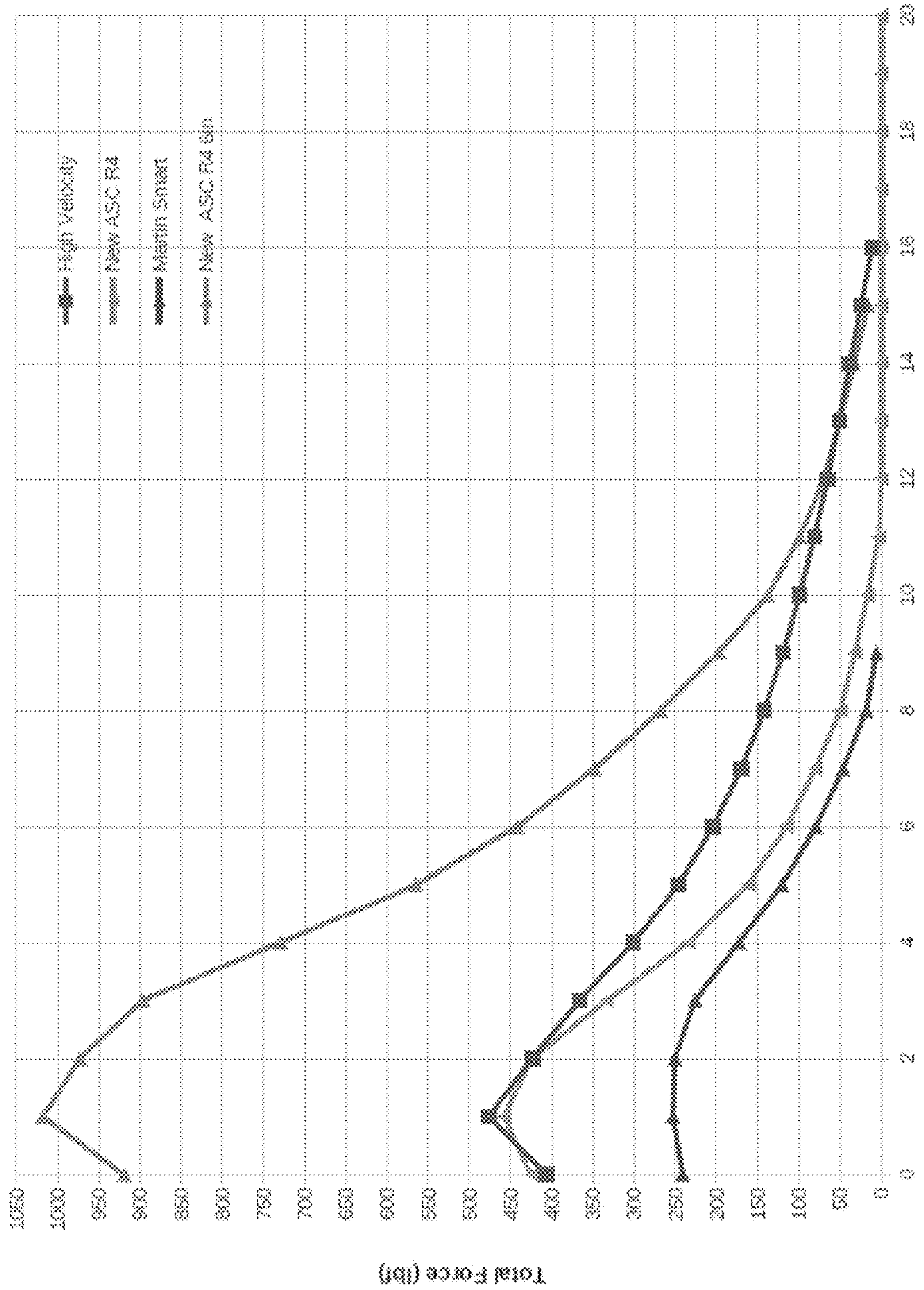
FIG. 8 is a comparative force to downstream distance chart.

As seen in reference to FIG. 8, the greater force of the improved fan jet nozzle 10 to provides a peak push through initial contact with buildup accumulated deposits on the kiln surfaces. The improved fan jet nozzle 10 generates superior cleaning than the high velocity nozzle, the traditional fan jet nozzle, and the modified fan jet nozzle.

Figure 9:
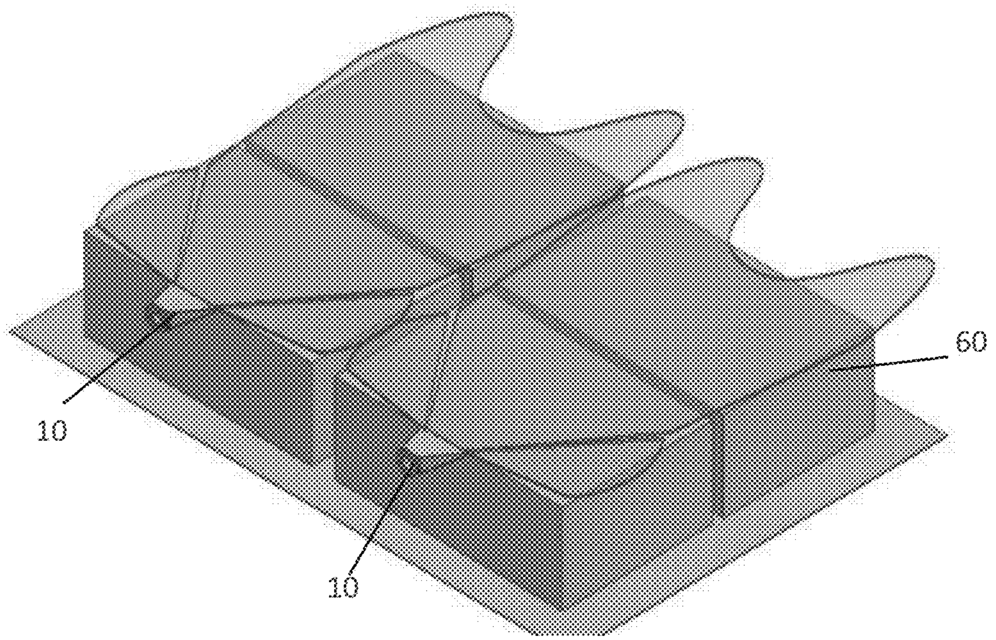
FIG. 9 is a perspective view of a cleaning width and depth of a conventional dual nozzle configuration for cleaning a catalyst bed.
Figure 10:
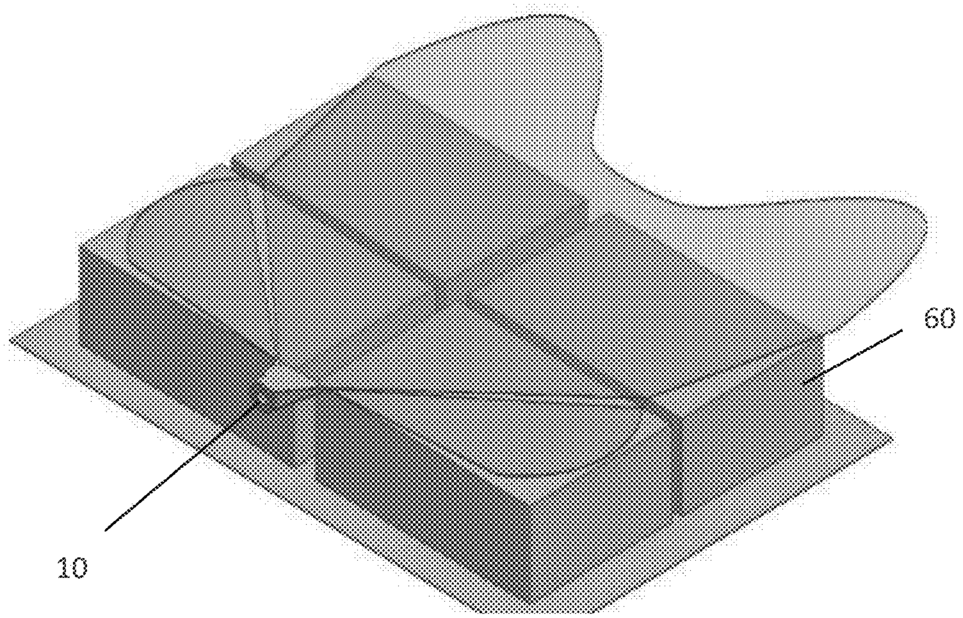
FIG. 10 is a perspective view of a cleaning width and depth of the improved fan jet nozzle.

The cleaning profiles of conventional fan jet nozzles against the improved fan jet nozzle 10 is shown in reference to FIGS. 9 and 10. The improved fan jet nozzle 10 can generate significant savings for cement producers. These savings will be realized in the installation, replacement, operation, and equipment costs.

Installation

The traditional fan jet nozzle is very expensive to install. Scaffolding and refractory work are often required, resulting in the average cost of about $2,000 per nozzle. The improved fan jet nozzle 10 eliminates those concerns and can replace the modified fan jet nozzle easily.

Replacement

The improved fan jet nozzle 10 may be treated with an austenitic nickel-based alloy containing 47.5% Nickel, 22% Chromium and 18.5% Iron, with small amounts of Cobalt, Molybdenum and Tungsten, such as Hastelloy®, available from Alloys International Inc. Ronkonkoma, NY, for resistance to oxidation at elevated temperatures, to protect mission-critical equipment from corrosive processes. When the same coating is applied to the improved fan jet nozzle 10, it doubles the life expectancy of the nozzle.

Operation

Since conventional fan jet nozzles do not produce enough cleaning energy, cement producers must supplement with manual rod cleaning, high-pressure water washing, or cardox cleaning. The improved fan jet nozzle 10 eliminates or substantially diminishes the need for supplemental cleaning methods. That generates significant maintenance savings and reduces the likelihood of a workplace accident.

Equipment

The improved fan jet nozzle 10 generates the biggest savings to equipment costs. By doubling the side-to-side cleaning, it reduces the number of required air cannons by 50%. These savings can increase exponentially when combined with a multi-port air cannon manifold.

Figure 11:
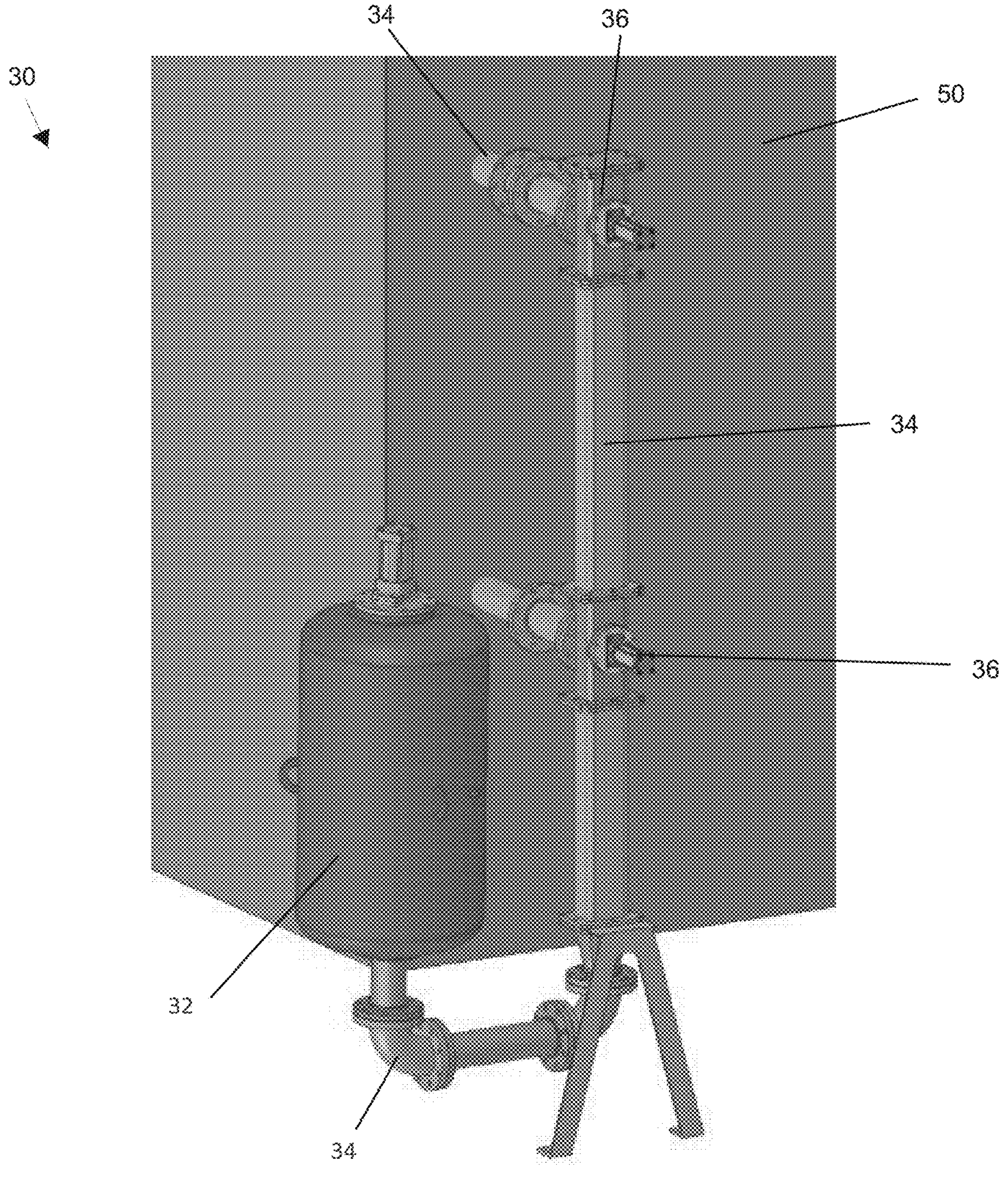
FIG. 11 is a view of a typical air cannon installation in a refractory liner.
Figure 12:
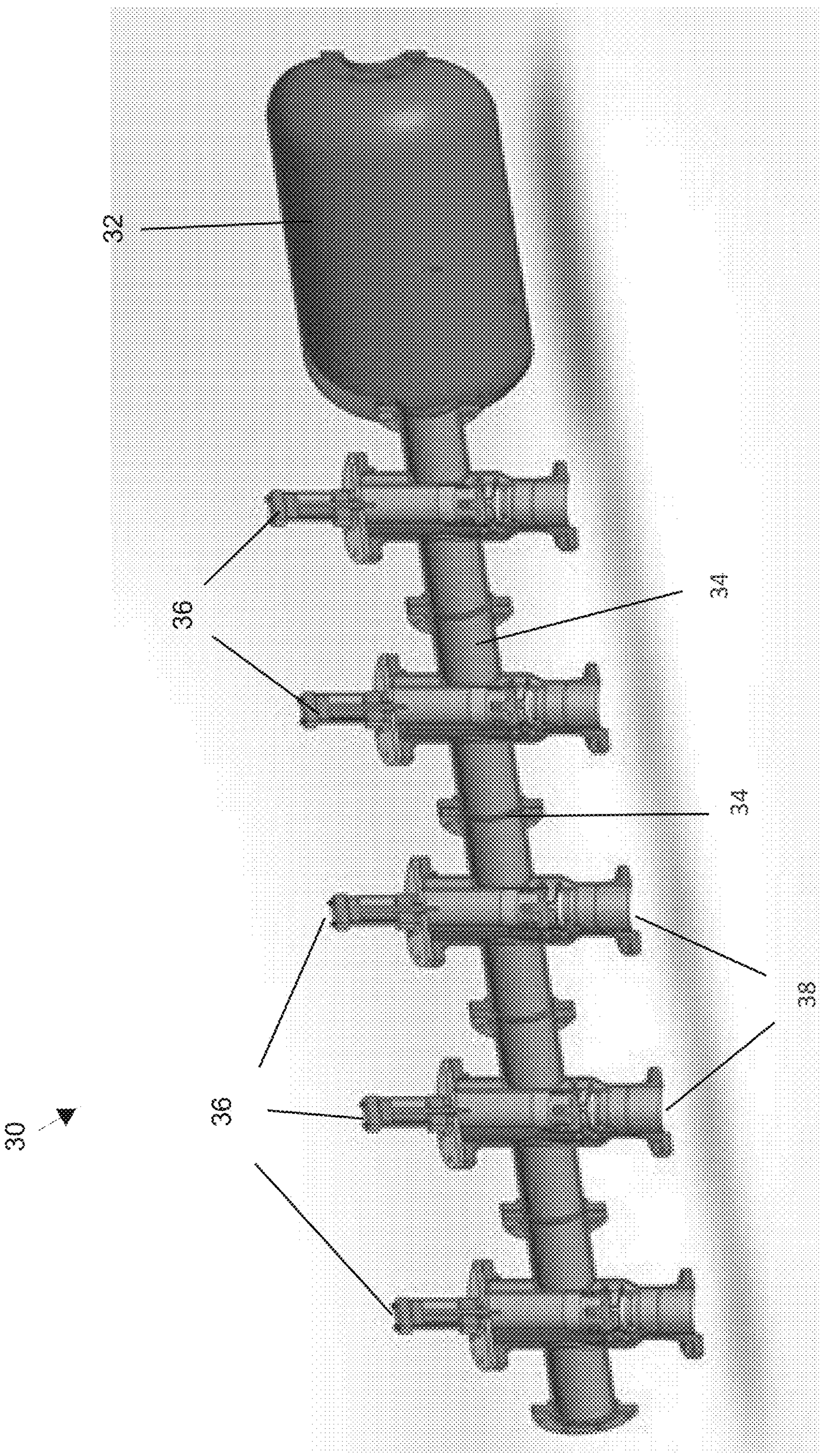
FIG. 12 is a perspective view of a multi-port air cannon manifold.

As seen in reference to FIGS. 11 and 12, the improved fan jet nozzle 10 may be employed in an air cannon system 30 having at least one air cannon reservoir 32 adapted to contain a pressurized source of a cleaning fluid, such as compressed air, carbon dioxide, or other inert gasses. A conduit 34 interconnects the air cannon reservoir 32 with an interior of a kiln refractory 50. A discharge valve 36 is operable to selectively discharge the pressurized source of the cleaning fluid into the kiln refractory 50. The improved fanjet nozzle 10 coupled with a discharge port 38 and is oriented to direct the discharged cleaning fluid at an accumulation area where deposits have a tendency to collect within the kiln refractory 50. As will be appreciated, the fan jet nozzle 10 may also be employed with a single air cannon reservoir 32 operatively connected to a plurality of discharge ports 38 via a manifold that selectively activates a corresponding discharge valve 36 controlling one of a plurality of discharge ports 38.

The improved performance of the fan jet nozzle 10 of the present invention permits replacement of eight (8) 150 L air cannons equipped with conventional fan jet nozzles with only 1 300 L multiplier with 4 improved fan jet nozzle 10 discharge points. This air cannon system will cost less, clean more effectively, and eliminate workplace safety hazards.

Industry trends demand a more efficient air cannon for two reasons. First, cement producers are steadily increasing their supplemental fuel ratio. Pet-coke produces buildup that is notoriously difficult to clean. Second, the economic environment has put a strain on capital projects. "It's something of a perfect storm. Producers are being asked to clean more buildup with less money". The improved fan jet nozzle 10 provides a low-cost technology that eliminates buildup.

It should be understood, of course, that the foregoing relates to exemplary embodiments of the invention and that modifications may be made without departing from the spirit and scope of the invention as set forth in the following claims.

What is claimed is:

1. A fan jet nozzle for air cannon cleaning system of a kiln refractory, comprising:

an inlet at a proximal end and an outlet at a distal end;

an opposed top and bottom sidewalls converge inwardly along a longitudinal axis of the fan jet nozzle towards the outlet, with an interior of the opposed top and bottom sidewalls having a convex curvature protruding inwardly towards an interior throat of the fan jet nozzle defined along each of the longitudinal axis and a transverse axis of the fan jet nozzle; and an opposed left and right lateral sidewalls converge towards the outlet, with an interior of the opposed left and right lateral sidewalls having a concave curvature protruding outwardly from the interior throat along the transverse axis of the fan jet nozzle.

2. The fan jet nozzle of claim 1, further comprising:

an arcuate indentation defined in the opposed left and right lateral sidewalls, the arcuate indentation disposed across the transverse axis of the fan jet nozzle.

3. The fan jet nozzle of claim 2, wherein the arcuate indentation is parabolic with an apex oriented towards the inlet.

4. The fan jet nozzle of claim 1, wherein the exterior of the opposed top and bottom sidewalls comprise a flat surface.

5. The fan jet nozzle of claim 4, wherein the flat surface of the exterior of the opposed top and bottom sidewalls include a parabolic shape having an apex oriented towards the inlet.

6. The fan jet nozzle of claim 1, wherein the inlet has a diameter of at least 4 inches.

7. The fan jet nozzle of claim 1, wherein the inlet has a diameter of at least 6 inches.

8. The fan jet nozzle of claim 1, further comprising:

an austenitic nickel-based alloy coating.

9. A fan jet nozzle for an air cannon cleaning system of a kiln refractory, comprising:

an inlet at a proximal end converges inwardly towards and an outlet at a distal end;

an interior sidewall of an opposed top and bottom sidewalls having a convex curvature protruding towards an interior throat of the fan jet nozzle defined along each of a longitudinal axis and a transverse axis thereof; and an interior sidewall of an opposed left and right lateral sidewalls having a concave curvature protruding outwardly from the interior throat along a transverse axis of the fan jet nozzle.

10. The fan jet nozzle of claim 9, the outlet further comprising:

an arcuate indentation proximal to a transverse centerline of the opposed left and right lateral sidewalls.

11. The fan jet nozzle of claim 9, the outlet further comprising:

an inner surface of the outlet flares radially outwardly around a periphery of the outlet.

12. The fan jet nozzle of claim 11, the outlet further comprising:

a distally protruding curvature across the opposed top and the bottom sidewalls.

* * * * *